(12) United States Patent
Lu et al.

(10) Patent No.: US 11,960,869 B2
(45) Date of Patent: Apr. 16, 2024

(54) ANDROID PENETRATION METHOD AND DEVICE FOR IMPLEMENTING SILENT INSTALLATION BASED ON ACCESSIBILITY SERVICES

(71) Applicant: Guangzhou University, Guangdong (CN)

(72) Inventors: Hui Lu, Guangdong (CN); Zhihong Tian, Guangdong (CN); Chengjie Jin, Guangdong (CN); Luxiaohan He, Guangdong (CN); Man Zhang, Guangdong (CN); Jiageng Yang, Guangdong (CN); Xinguo Zhang, Guangdong (CN); Dongqiu Huang, Guangdong (CN); Qi Sun, Guangdong (CN); Yanbin Sun, Guangdong (CN); Shen Su, Guangdong (CN)

(73) Assignee: Guangzhou University, Guangdong (CN)

( * ) Notice: Subject to any disclaimer, the term of this patent is extended or adjusted under 35 U.S.C. 154(b) by 92 days.

(21) Appl. No.: 17/568,744

(22) Filed: Jan. 5, 2022

(65) Prior Publication Data
US 2022/0129256 A1 Apr. 28, 2022

Related U.S. Application Data

(63) Continuation of application No. PCT/CN2020/115106, filed on Sep. 14, 2020.

(30) Foreign Application Priority Data

Nov. 20, 2019 (CN) .......................... 201911145612.9

(51) Int. Cl.
*G06F 8/61* (2018.01)
*G06F 8/53* (2018.01)
*G06F 9/451* (2018.01)

(52) U.S. Cl.
CPC ................ *G06F 8/61* (2013.01); *G06F 8/53* (2013.01); *G06F 9/451* (2018.02)

(58) Field of Classification Search
CPC ............... G06F 8/53; G06F 8/61; G06F 9/451
See application file for complete search history.

(56) References Cited

U.S. PATENT DOCUMENTS 9,092,291 B1 * 7/2015 Adib ....................... G06F 9/451
9,575,739 B2 * 2/2017 Bhattiprolu .............. G06F 8/61
(Continued)

FOREIGN PATENT DOCUMENTS

| CN | 105893081 A | 8/2016 |
| CN | 106529294 A | 3/2017 |

(Continued)

OTHER PUBLICATIONS

Zheng et al., "Security Analysis of Modern Mission Critical Android Mobile Applications", published by ACM, ACSW '17, Jan. 31-Feb. 3, 2017, Geelong, Australia, pp. 1-9 (Year: 2017).*

(Continued)

*Primary Examiner* — S. Sough
*Assistant Examiner* — Zheng Wei
(74) *Attorney, Agent, or Firm* — LOZA & LOZA, LLP; Michael Fedrick

(57) ABSTRACT

An Android penetration method and device for implementing silent installation based on accessibility services. The method includes: acquiring a second target application by adding a load program to a first target application and adding penetration permissions using an Android decompilation technology; and implementing silent installation of the second target application using an accessibility service technology.

4 Claims, 2 Drawing Sheets

---

Acquiring a second target application by adding a load program to a first target application and adding penetration permissions using an Android decompilation technology — S0

Implementing silent installation of the second target application using an accessibility service technology — S1

(56) References Cited

U.S. PATENT DOCUMENTS

| | | | |
|---|---|---|---|
| 2011/0214075 A1* | 9/2011 | Vongphouthone | G06F 9/542 |
| | | | 715/760 |
| 2013/0298116 A1* | 11/2013 | Ou | G06F 8/61 |
| | | | 717/170 |
| 2014/0237405 A1* | 8/2014 | Wu | G06F 3/04845 |
| | | | 715/765 |
| 2016/0162276 A1 | 6/2016 | Peng et al. | |
| 2017/0286081 A1 | 10/2017 | Shantharam et al. | |
| 2018/0136920 A1* | 5/2018 | Devagupthapu | G06F 8/61 |
| 2018/0173517 A1* | 6/2018 | Shantharam | H04W 4/08 |

FOREIGN PATENT DOCUMENTS

| | | |
|---|---|---|
| CN | 107577955 A | 1/2018 |
| CN | 109088977 A | 12/2018 |
| CN | 110865824 A | 3/2020 |

OTHER PUBLICATIONS

Buthaina Mohammed AlAl-Zadjali, "Penetration Testing of Vulnerability in Android Linux Kernel Layer via an Open Network (Wi-Fi)", published by International Journal of Computer Applications (0975-8887), vol. 134—No. 6, Jan. 2016, pp. 40-43 (Year: 2016).*

Khulood Al Zaabi, "Android Device Hacking Tricks and Countermeasures", published by IEEE, 2016, pp. 1-10 (Year: 2016).*

Liu et al., "A Case Study on Key Technologies of Android Trojans", published by IEEE, 2014 11th International Computer Conference on Wavelet Actiev Media Technology and Information Processing(ICCWAMTIP) (pp. 321-324) (Year: 2014).*

Lee et al., "Ghost Installer in the Shadow: Security Analysis of App Installation on Android", published by IEEE, 2017 47th Annual IEEE/IFIP International Conference on Dependable Systems and Networks, pp. 403-411 (Year: 2017).*

International search report of PCT Patent Application No. PCT/CN2020/115106 dated Dec. 14, 2020.

Kang, Haiyan et al., Analysis of Information Security Vulnerabilities and Penetration Attack Based on Social Engineering, Journal of Information Security Research, Feb. 2017, pp. 116-122, vol. 3 No. 2, China Academic Journal Electronic Publishing House.

Injecting Metasploit Payloads into Android Applications, Penetration Testing Lab, Mar. 13, 2017, pp. 1-6.

Android-Accessibility (Accessibility/Barrier-free, Automatic Install APP)_http://lioil.win-CSDN Blog, May 9, 2018, pp. 1-2.

* cited by examiner

ANDROID PENETRATION METHOD AND DEVICE FOR IMPLEMENTING SILENT INSTALLATION BASED ON ACCESSIBILITY SERVICES

CROSS REFERENCE TO RELATED APPLICATIONS

The present application is a Continuation Application of PCT Application No. PCT/CN2020/115106 filed on Sep. 14, 2020, which claims the priority of Chinese patent application No. 201911145612.9, filed on Nov. 20, 2019. The contents of the above-identified applications are incorporated herein by reference in their entirety.

TECHNICAL FIELD

The present invention relates to the field of computer technologies, and in particular to an Android penetration method and device for implementing silent installation based on accessibility services.

BACKGROUND

At present, the mainstream of silent installation is the system-level modification and installation source code technology. This technology is divided into two steps. The first step is to find the Package Installer source code in the Android system, skip the permission grant reminder, and directly call the following installation API. The second step is to use the pm install command to install, and bypass the permission grant prompt in Package Installer, thereby completing silent installation.

Due to being a system API, the most intuitive thing is to declare the permissions to install the application: android.permission.INSTALL_PACKAGES. Such sensitive permissions are not given by the system immediately upon declaration. It also requires the installation package APK file to have the same signature as the system in order to complete the silent installation operation. Therefore, this method of silent installation is unrealistic for widespread promotion and application.

A technology of "allowing the silent installation of terminal authorized applications" also exists. When a silent installation request initiated by a terminal authorized application (such as mobile application market software) is detected, it will be permitted directly to facilitate the update and installation of the mobile terminal application market software. When a silent installation behavior from any other software on the mobile phone, any software from unknown sources, and PC side tools is detected, a prompt will be asked to indicate the installation source and the name of the software being installed. A user may choose to allow or deny this silent installation. The processing results will be saved in a silent installation monitoring log for the user to view. Data of the monitoring log is stored locally and presented to the user through a log interface, displaying specific information such as the source of the silent installation, the object of the silent installation, the time when the silent installation behavior occurred, and the result of the silent installation.

In the second solution, preset silent installation rules are matched according to the application, and the silent installation of the application is permitted, prompted or prohibited according to the matching results. To a certain extent, interactive content with the user still exists, which is not "silent" in the absolute sense. Moreover, the complexity of inter-process communication is greater than that of inter-thread communication. Of course, both AIDL and Broadcast can solve this problem. However, when encountering a plurality of installation requests, these two implementations based on Binder will also encounter problems.

SUMMARY OF THE INVENTION

In order to solve the above technical problems, embodiments of the present invention provide an Android penetration method and device for implementing silent installation based on accessibility services, so that a terminal can perform silent penetration test without root and user interaction.

The embodiment of the present invention provides an Android penetration method for implementing silent installation based on accessibility services, including:
acquiring a second target application by adding a load program to a first target application and adding penetration permissions using an Android decompilation technology; and
implementing silent installation of the second target application using an accessibility service technology.

Further, the Android penetration method for implementing silent installation based on accessibility services further includes: overwriting Metasploit's reverse TCP connection session, specifically,
implementing the silent installation of the second target application regularly by adding a timing manager, and enabling a penetration load in the second target application to enter a destruction operation program;
rewriting the destruction operation program in a service class, and realizing an onDestroy self-start function of the silent installation of the second target application through a disconnected and re-established event definition; and
restarting the second target application at a set time interval based on a shell script according to the onDestroy self-start function.

Further, implementing the silent installation of the second target application using the accessibility service technology includes:
declaring accessibility service permissions through accessibility management service configuration;
acquiring controllable information of an interactive interface by monitoring a package name of the second application through accessibility service Info configuration;
searching for predefined text content in the interactive interface through interface UI exploration, and determining whether a control carrying the text content is a predefined control, and if so, simulating a user click operation; and
sending a second application installation request to a smart terminal through transfer in an accessibility manager, so that the smart terminal implements the silent installation based on the acquired control.

The embodiment of the present invention also provides an Android penetration device for implementing silent installation based on accessibility services, including:
a decompilation module, configured to acquire a second target application by adding a load program to a first target application and adding penetration permissions using an Android decompilation technology; and
an accessibility service module, configured to implement silent installation of the second target application using an accessibility service technology.

Further, the Android penetration device for implementing silent installation based on accessibility services further includes: a stability improvement module, configured to overwrite Metasploit's reverse TCP connection session, specifically, the stability improvement module is configured to implement the silent installation of the second target application regularly by adding a timing manager, and enable a penetration load in the second target application to enter a destruction operation program;

the stability improvement module is further configured to rewrite the destruction operation program in a service class, and realize an onDestroy self-start function of the silent installation of the second target application through a disconnected and re-established event definition; and the stability improvement module is further configured to restart the second target application at a set time interval based on a shell script according to the onDestroy self-start function.

Further, the accessibility service module includes:

an accessibility management service configuration unit, configured to declare accessibility service permissions;

an accessibility service Info configuration unit, configured to acquire controllable information of an interactive interface by monitoring a package name of the second application;

an interface UI exploration unit, configured to search for predefined text content in the interactive interface, and determine whether a control carrying the text content is a predefined control, and if so, simulate a user click operation; and an accessibility manager transfer unit, configured to send a second application installation request to a smart terminal, so that the smart terminal implements the silent installation based on the acquired control.

In the embodiment of the present invention, a second target application is acquired by adding a load program to a first target application and adding penetration permissions using an Android decompilation technology; and silent installation of the second target application is implemented using an accessibility service technology, so that a terminal can complete silent installation without root and user interaction.

DETAILED DESCRIPTION

The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments acquired by those skilled in the art without creative work shall fall within the scope of protection of the present invention.

Accessibility services are also called Hook technology in Android. In Windows, the function of Hook is to monitor everything to be monitored, and the accessibility service in Android may also monitor certain required functions. A silent installation implementation architecture based on Accessibility is designed into four stages: accessibility management service configuration, accessibility service Info configuration, interface UI exploration, and transfer in AccessibilityManager (hereinafter referred to as accessibility manager).

Figure 1:
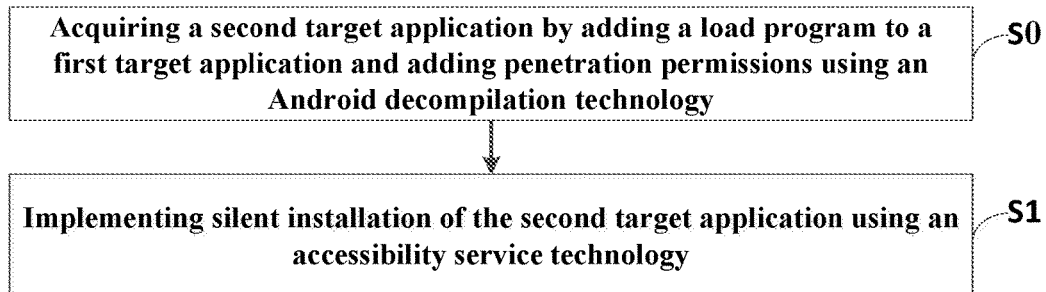
FIG. 1 is a flowchart of an Android penetration method for implementing silent installation based on accessibility services according to an embodiment of the present invention.
Figure 2:
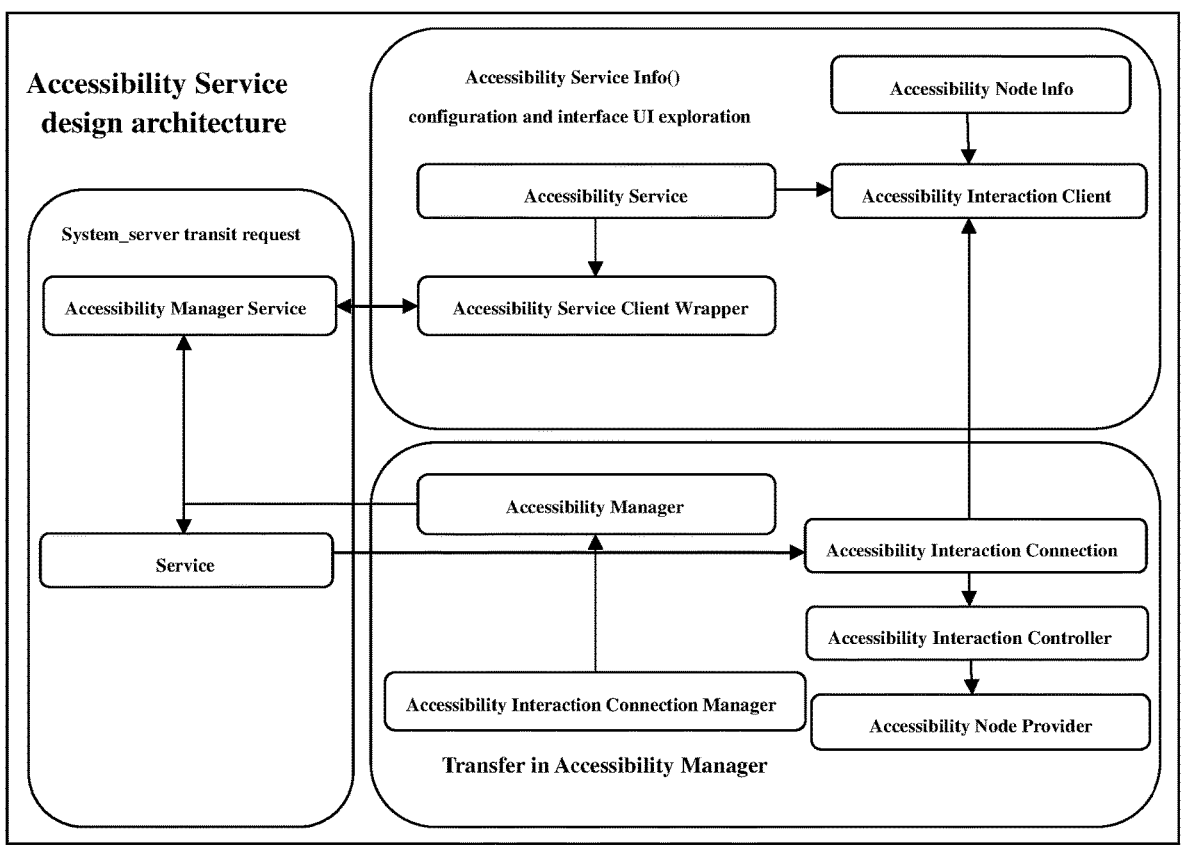
FIG. 2 is a schematic diagram of an accessibility service design architecture according to an embodiment of the present invention.
Figure 3:
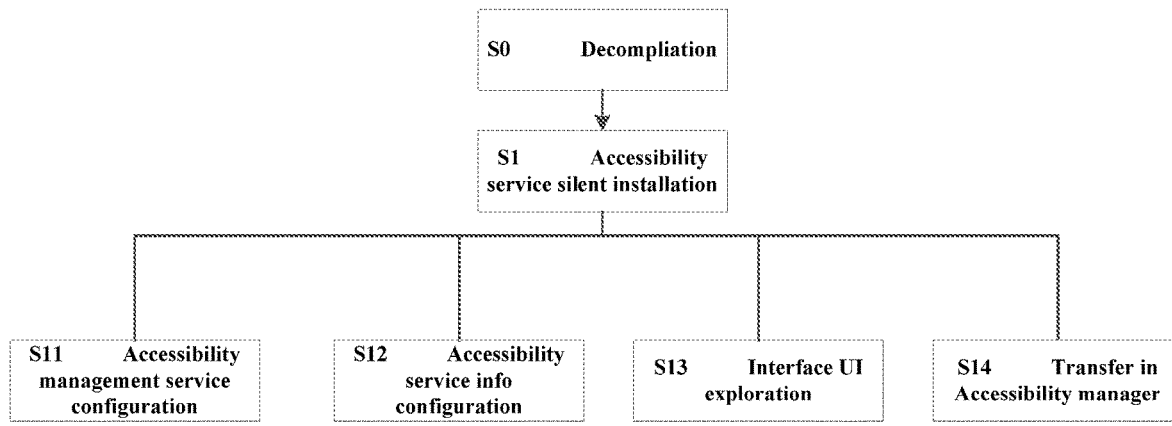
FIG. 3 is another flowchart of an Android penetration method for implementing silent installation based on accessibility services according to an embodiment of the present invention.

Referring to FIGS. 1 to 3, an embodiment of the present invention provides an Android penetration method for implementing silent installation based on accessibility services. The method includes the following steps.

S0. a second target application is acquired by adding a load program to a first target application and adding penetration permissions using an Android decompilation technology.

Specifically, an onCreat method is found in a smali file, load codes in charge of startup are added under a bundle instance, a metasploit folder of the load is moved to a com directory under a smali folder decompiled by a normal application installation package, and then some permissions for penetration are added to an xml file and back-compilation is performed to finally generate an application with a virus that can bypass anti-virus software.

S1. silent installation of the second target application is implemented using an accessibility service technology.

Implementing the silent installation of the second target application using the accessibility service technology includes the following steps.

S11. accessibility service permissions are declared through accessibility management service configuration.

Specifically, accessibility auxiliary function permissions are declared using a BIND method, and a terminal system can bind accessibility services. Its core definition in intent-filter is: android:permission="android.permission. BIND_ACCESSIBILITY_SERVICE".

In addition, the amount of redundant information can be reduced to a minimum by configuring filtering directly in meta-data.

S12. controllable information of an interactive interface is acquired by monitoring a package name of the second application through accessibility service Info configuration.

In the embodiment of the present invention, the package name of the second application is monitored, a node object instance of Info is acquired using root node query or a traceability query method, and the object instance is used as a UI node of this event. An accessibility service class is rewritten to monitor changes in an interface of a mobile smart terminal and then trigger a callback function to acquire controllable information of an interactive UI.

S13. predefined text content is found in the interactive interface through interface UI exploration, and whether a control carrying the text content is a predefined control is determined, and if so, a simulated user click operation is performed. In the embodiment of the present invention, the predefined text content is: "OK", "Install", "Next", and "Finish". The search method may be exact search or fuzzy search. For example, when looking for the text "install", text like "install?" and the system title "install" will be found. Then, it is necessary to determine whether a control carrying the text content is a control required for the installation, and if so, a user clicking the "install" button is simulated to achieve the effect of automatic click.

S14. a second application installation request is sent to a smart terminal through transfer in an accessibility manager, so that the smart terminal implements the silent installation based on the acquired control text content.

In the embodiment of the present invention, first, before triggering the installation of the second application, whether the control acquired in the interactive interface in step S13 exists is determined, and if so, the second application installation request is sent to the smart terminal.

In the transfer process of request information, a task getServiceLocked( ) function for detecting a corresponding service object is completed, and if a detection value is empty, a tryConnectToServiceLocked( ) method is called. The function of ServiceManger is the core of the entire Accessibility system. It also plays a significant role in the Android system. It runs immediately after an initialization process is started. It is used to manage various system level services common in the Android system (InputMethodService and ActivityManagerService and the like are also under its jurisdiction) and provide a client with a function of querying related services. After acquiring the service object, the accessibility manager will command the system to receive an auxiliary event message, and then detect related accessibility services using a package name of the message. After the detection step, the accessibility event listener immediately starts to receive the auxiliary event. By then, the operation of the accessibility service system has begun to enter the cycle stage and achieved the effect of silent installation.

In the silent installation method based on Android native accessibility service classes according to the embodiment of the present invention, by only using the Android system to develop native classes without adding new modules or units, the terminal can realize 100% silent installation of applications without root and user interaction, and by adding load programs and penetration permissions in the applications, penetration test of the terminal can be realized without user interaction.

Figure 4:
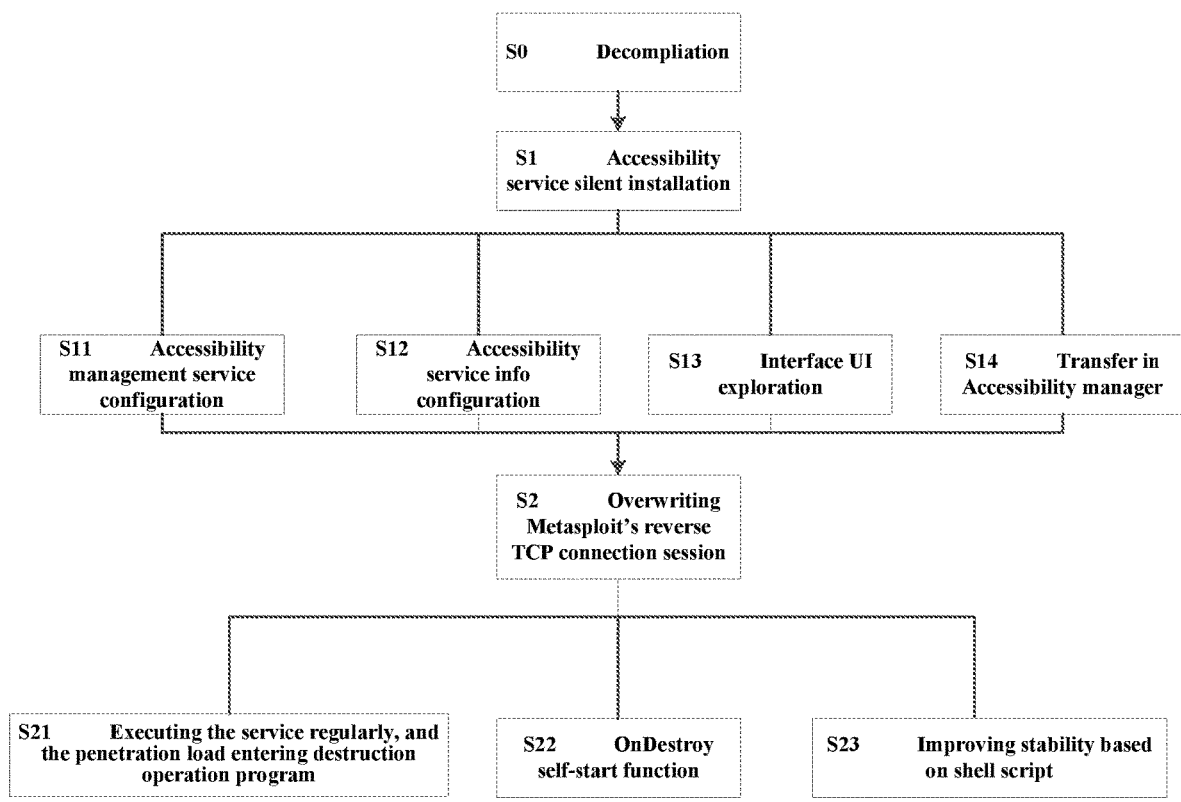
FIG. 4 is a flowchart of an Android penetration method for implementing silent installation based on accessibility services according to another embodiment of the present invention.

Referring to FIG. 4, in a preferred embodiment, the Android penetration method for implementing silent installation based on accessibility services further includes S2 of overwriting Metasploit's reverse TCP connection session.

Specifically, S21. the silent installation of the second target application is executed regularly by adding a timing manager, and a penetration load in the second target application enters a destruction operation program.

Specifically, the location of the Accessibility service is started, an onBind method of an IBinder class is rewritten, and intent is adopted for triggering. At the same time, an onStartCommand method needs to be rewritten, the intent is also adopted for triggering, the load start is detected and the value of start_sticky is returned in real time.

It should be noted that if a load disconnection service does not end, the destruction operation in the service class will not be called, and the service will not be re-executed. Therefore, by adding the timing manager, the silent installation of the second target application can be executed regularly, and the penetration load in the second target application program can enter the destruction operation program, improving stability.

S22. the destruction operation program in a service class is rewritten, and an onDestroy self-start function of the silent installation of the second target application is realized through disconnected and re-established event definition.

Specifically, an onDestroy method in the service class is rewritten to realize the onDestroy self-start function, and at the same time, it is located that Android attack and files exploiting modules exist in Metasploit source codes (i.e., MainService.java package) and added to a MainService class.

By rewriting the destruction operation program in the service class, disconnecting and re-establishing event definition, the onDestroy self-start function of the silent installation of the second target application can be realized, which can realize sustainable connection of the load and further improve the stability.

S23. the second target application is restarted at a set time interval based on a shell script and according to the onDestroy self-start function.

Specifically, by re-running android.intent.action.MAIN every 20 seconds, and reloading a MainActivity method in the second target application package file, it is possible to simulate the user restarting the second target application every 20 seconds.

In the embodiment of the present invention, by means of the initiation and destruction method of overwriting Metasploit's reverse TCP connection session, combined with a specific shell script, the stability can be greatly improved.

At the same time, the modification of onStartCommand and onDestroy in the source codes of Metasploit's reverse TCP connection session and its use in combination with the shell script is not only limited to stability modifications, but also can complete various source-code-level penetration effect modifications and other performance improvements. The implementation cost is low, the efficiency is high, and the subsequent scalability is strong.

An embodiment of the present invention also provides a device corresponding to any one of the foregoing embodiments, including:

a decompilation module, configured to acquire a second target application by adding a load program to a first target application and adding penetration permissions using an Android decompilation technology; and an accessibility service module, configured to implement silent installation of the second target application using an accessibility service technology.

The accessibility service module includes:

an accessibility management service configuration unit, configured to declare accessibility service permissions;

an accessibility service Info configuration unit, configured to acquire controllable information of an interactive interface by monitoring a package name of the second application;

an interface UI exploration unit, configured to search for predefined text content in the interactive interface, and determine whether a control carrying the text content is a predefined control, and if so, simulate a user click operation; and an accessibility manager transfer unit, configured to send a second application installation request to a smart terminal, so that the smart terminal implements the silent installation based on the acquired control.

In the silent installation method based on Android native accessibility service classes according to the embodiment of the present invention, by only using the Android system to develop native classes without adding new modules or units, the terminal can realize 100% silent installation of applications without root and user interaction, and by adding load programs and penetration permissions in the applications, penetration test of the terminal can be realized without user interaction.

In a preferred embodiment, the Android penetration device for implementing silent installation based on the accessibility service further includes: a stability improvement module, configured to overwrite Metasploit's reverse TCP connection session, specifically, the stability improvement module is configured to implement the silent installation of the second target application regularly by adding a timing manager, and enable a penetration load in the second target application to enter a destruction operation program;

the stability improvement module is further configured to rewrite the destruction operation program in a service class, and realize an onDestroy self-start function of the silent installation of the second target application through a disconnected and re-established event definition; and the stability improvement module is further configured to restart the second target application at a set time interval based on a shell script according to the onDestroy self-start function.

In the embodiment of the present invention, by means of the initiation and destruction method of overwriting Metasploit's reverse TCP connection session, combined with a specific shell script, the stability can be greatly improved.

It should be noted that more specific implementations and corresponding principles of the embodiment of the present invention are the same as those of the method corresponding to the embodiment of the present invention, and will not be described here.

Described above are preferred embodiments of the present invention. It should be noted that those skilled in the art may make several improvements and modifications without departing from the principle of the present invention, and these improvements and modifications should also be regarded as the scope of protection of the present invention.

What is claimed is:

1. An Android penetration method for implementing silent installation based on accessibility services, comprising:

acquiring a second target application by adding a load program to a first target application and adding penetration permissions using an Android decompilation technology; and implementing the silent installation of the second target application using an accessibility service technology;

wherein implementing the silent installation of the second target application using the accessibility service technology comprises steps:

declaring accessibility service permissions through accessibility management service configuration;

acquiring controllable information of an interactive interface by monitoring a package name of the second target application through accessibility service Info configuration;

searching for predefined text content in the interactive interface through a User Interface (UI) exploration, and determining whether a control carrying the text content is the control required for the silent installation, and if so, simulating a user click operation for the silent installation; and sending a second application installation request to a smart terminal through transfer in an accessibility manager, so that the smart terminal implements the silent installation based on the required control.

2. The Android penetration method for implementing the silent installation based on the accessibility services according to claim 1, further comprising a step of overwriting Metasploit's reverse Transmission Control Protocol (TCP) connection session, wherein the step of overwriting the Metasploit's reverse TCP connection session comprises:

implementing the silent installation of the second target application periodically by adding a timing manager, and enabling a penetration load in the second target application to enter a destruction operation program;

rewriting the destruction operation program in a service class, and realizing an onDestroy self-start function of the silent installation of the second target application through a disconnected and re-established event definition; and restarting the second target application at a set time interval based on a shell script according to the onDestroy self-start function.

3. The Android penetration method for implementing the silent installation based on the accessibility services according to claim 1, wherein in the step of declaring the accessibility service permissions through the accessibility management service configuration, includes accessibility auxiliary function permissions which are declared by using a BIND method, and a terminal system is capable of binding the accessibility services.

4. The Android penetration method for implementing the silent installation based on the accessibility services according to claim 1, wherein in the step of acquiring controllable information of an interactive interface by monitoring a package name of the second target application through accessibility service Info configuration, the package name of the second application is monitored, a node object instance of Info is acquired using root node query or a traceability query method, and the node object instance is used as a UI node of an event; an accessibility service class is rewritten to monitor changes in an interface of a mobile smart terminal and then trigger a callback function to acquire controllable information of the UI.

* * * * *